UNITED STATES PATENT OFFICE.

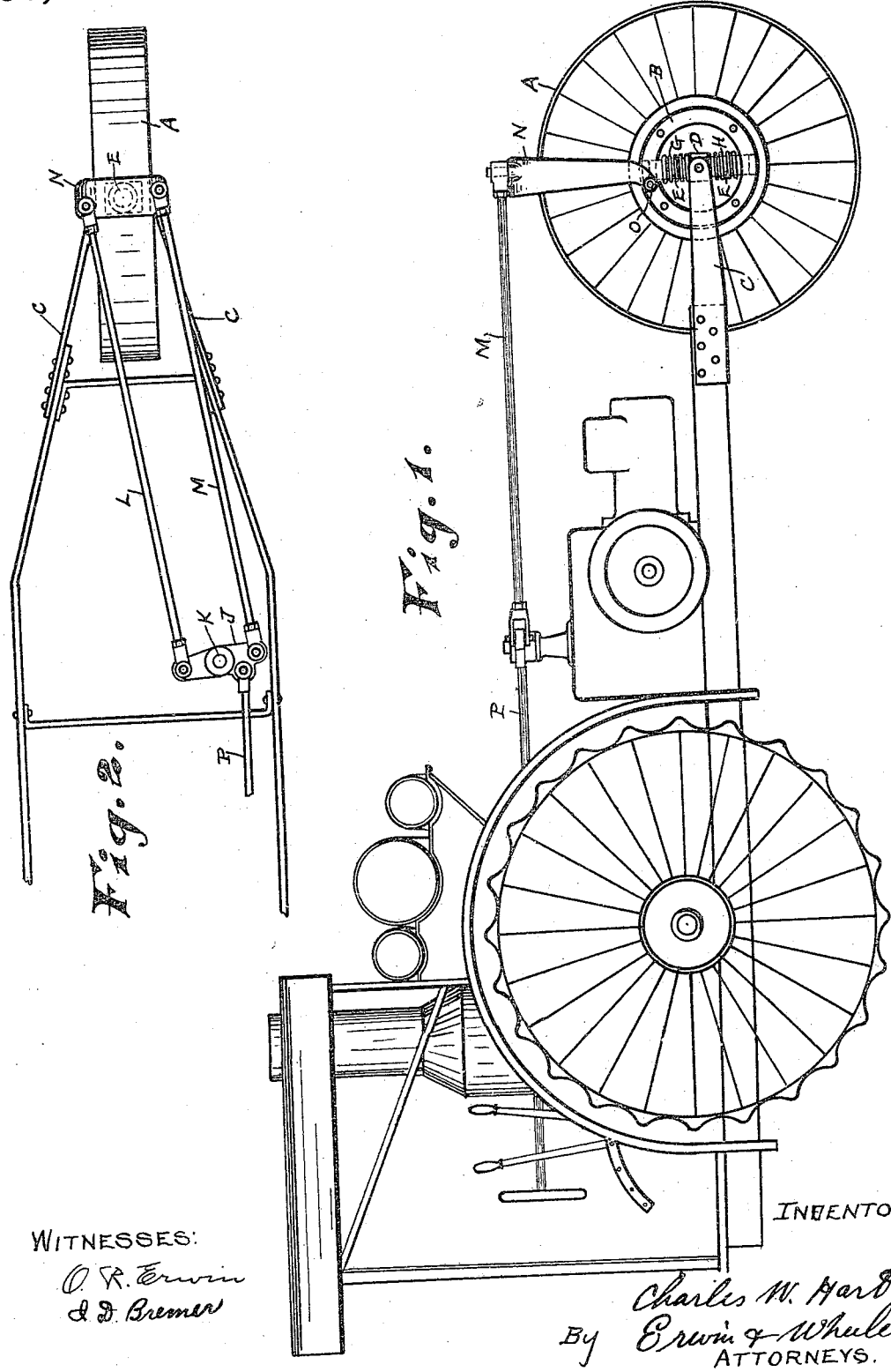

CHARLES W. HART, OF CHARLES CITY, IOWA.

STEERING-WHEEL FOR TRACTION-VEHICLES.

950,045. Specification of Letters Patent. Patented Feb. 22, 1910.

Application filed March 17, 1909. Serial No. 483,891.

*To all whom it may concern:*

Be it known that I, CHARLES W. HART, a citizen of the United States, residing at Charles City, county of Floyd, and State of Iowa, have invented new and useful Improvements in Steering-Wheels for Traction-Vehicles, of which the following is a specification.

My invention relates to improvements in cushioned steering wheels for traction vehicles.

The objects of my invention are to provide a steering wheel with a cushioned hub in which the stability and strength of the frame and wheel will not be affected by the cushioning devices, and also to provide improved steering connections which will be wholly independent of the supporting connections, and which will operate through points on opposite sides of the vertical axis of the steering pivot.

In the following description, reference is had to the accompanying drawings, in which—

Figure 1 is a side view of a vehicle having a single steering wheel embodying my invention. Fig. 2 is a detail plan view of the steering connections.

Like parts are identified by the same reference characters in both views.

The traction vehicle illustrated is of the three wheel type, the front or steering wheel A being mounted upon an oscillatory hub ring B. This is connected with the frame by arms C, C, and a pivot block D, having vertical pivot posts or trunnions E, is socketed in the hub ring. The pivot block D is rigidly secured to the arms C, C, the front ends of which may be secured in any suitable manner, preferably by socketing the front ends of the arms in the block and bolting them thereto. Cushion springs G and H are coiled about the pivot posts E above and below the block D and between it and ring B. The hub ring B is oscillated to steer the vehicle, from a lever J. This is pivoted to the body of the vehicle at K, and arranged to transmit motion to the hub ring B through the link rods L and M, and a fork N, the latter being arranged to straddle the rim of the wheel, with its extremities bolted to the ring B at O, preferably with a single pivot bolt to avoid strains and allow sufficient play to equalize the stress on both actuating rods. The link rods L and M are secured to the lever at opposite sides of its fulcrum pivot K and to the fork N at opposite sides of the central plane of the wheel, or of the axis of the steering pivots E projected. In oscillating the hub ring B and wheel A therefore, one of the rods L (or M), will pull upon its connection with the steering fork N, and the other will push on its connection at the opposite side of the axis of oscillation thus providing a very effective steering mechanism. The points of connection with the fork are in a line at a large angle to the plane of the wheel preferably at nearly a right angle and to the line of movement of the vehicle when running straight ahead, and there will therefore be no appreciable lost motion under ordinary conditions, the link rods being connected substantially at the most effective point for oscillating the yoke from its normal position.

The lever J may be actuated from the source of power through a rod P. It is not material to this invention what constitutes the source of power nor how it is applied to this rod.

Having thus described my invention what I claim as new and desire to secure by Letters Patent is,—

1. The combination with a steering wheel, of a supporting frame member, an oscillatory ring pivoted thereto, a fork straddling the wheel rim and connected with the oscillatory ring, an actuating lever and link rods connected to the lever on opposite sides of its fulcrum, and to the fork on opposite sides of the steering pivot axis.

2. The combination with a steering wheel, of a supporting frame member, an oscillatory ring pivoted thereto, a fork straddling the wheel rim and connected with the oscillatory ring, an actuating lever and link rods connected to the lever on opposite sides of its fulcrum, and to the fork on opposite sides of the steering pivot axis, said points of connection with the fork being in a line extending at a large angle to the plane of the wheel.

3. The combination with a steering wheel, of a supporting frame member, an oscillatory ring pivoted thereto, a fork straddling the wheel rim and connected with the oscillatory ring, an actuating lever and link rods connected to the lever on opposite sides of its fulcrum, and to the fork on opposite sides of the steering pivot axis, together with buffer springs interposed between the oscillatory ring and the supporting frame member above and below such member.

4. The combination with a steering wheel, of a centrally disposed hub ring, a frame member extending through the hub ring and connected with the vehicle frame at both sides of the wheel, vertically extending pivot posts on said frame member centrally socketed in the top and bottom portions of the ring, buffer springs coiled about said pivot posts and steering connections secured to said ring.

5. The combination with a steering wheel, of a centrally disposed hub ring, a frame member extending through the hub ring and connected with the vehicle frame at both sides of the wheel, vertically extending pivot posts on said frame member centrally socketed in the top and bottom portions of the ring, buffer springs coiled about said pivot posts and steering connections extending to the respective sides of said ring and arranged to simultaneously pull upon one side and push upon the other, when actuated to oscillate the wheel upon the axis of said pivot posts.

6. The combination with a steering wheel, of a supporting frame member, an oscillatory ring pivoted thereto, a fork straddling the wheel rim and pivotally connected with the oscillatory ring, an actuating lever, and link rods connected to the lever on opposite sides of its fulcrum, and to the fork on opposite sides of the steering pivot axis.

In testimony whereof I affix my signature in the presence of two witnesses.

CHARLES W. HART.

Witnesses:
   LEVERETT C. WHEELER,
   O. R. ERWIN.